United States Patent
Prasad et al.

(10) Patent No.: US 11,120,256 B2
(45) Date of Patent: Sep. 14, 2021

(54) METHOD OF META-DATA EXTRACTION FROM SEMI-STRUCTURED DOCUMENTS

(71) Applicant: Zycus Infotech Pvt. Ltd., Mumbai (IN)

(72) Inventors: Durga Prasad, Mumbai (IN); Vijesh Bhaktha, Mumbai (IN); Alok Jain, Mumbai (IN)

(73) Assignee: Zycus Infotech Pvt. Ltd., Mumbai (IN)

( * ) Notice: Subject to any disclaimer, the term of this patent is extended or adjusted under 35 U.S.C. 154(b) by 0 days.

(21) Appl. No.: 16/810,530

(22) Filed: Mar. 5, 2020

(65) Prior Publication Data

US 2020/0311410 A1    Oct. 1, 2020

(30) Foreign Application Priority Data

Mar. 28, 2019 (IN) .............................. 201921012225

(51) Int. Cl.
| | |
|---|---|
| G06K 9/00 | (2006.01) |
| G06K 9/03 | (2006.01) |
| G06K 9/62 | (2006.01) |
| G06K 9/34 | (2006.01) |

(52) U.S. Cl.
CPC .......... *G06K 9/00463* (2013.01); *G06K 9/03* (2013.01); *G06K 9/6217* (2013.01); *G06K 2009/00489* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 10,127,673 | B1 * | 11/2018 | Ben Khalifa | G06K 9/00463 |
| 10,347,293 | B1 * | 7/2019 | Skinner | G06F 40/30 |
| 10,872,236 | B1 * | 12/2020 | Elor | G06K 9/2072 |
| 2016/0210507 | A1 * | 7/2016 | Abdollahian | G06K 9/2027 |
| 2020/0250263 | A1 * | 8/2020 | Rimchala | G06F 40/284 |

FOREIGN PATENT DOCUMENTS

EP               779594 A2 *   6/1997   ............... G06K 9/32

* cited by examiner

*Primary Examiner* — Mohammed Rachedine
(74) *Attorney, Agent, or Firm* — Preston Smirman; Smirman IP Law, PLLC

(57) ABSTRACT

A method of extracting meta-data from semi structured documents, by using area and cone orientation as relevance between words/phrases is described. It also a computer implemented system to handle OCR errors with respect to the coordinates interpreted for each word and user corrections both in online and offline mode. The method is carried out by the steps as follows: converting scanned or digital document to a readable format with coordinates using OCR; scanning the coordinates obtained through OCR for each character; marking all potential labels and values with a bounding box; searching for relevant labels for the particular value by using default control parameters and adjusting trainable parameters; mapping a cone region for the labels and values using the upper and lower angles along x-axis and the scope box and formulating the score area to get the confidence percentage which is used as measure to extract all relevant label-value pairs.

10 Claims, 4 Drawing Sheets

OCR Coordinates

Standardized and Corrected coordinates

Invoice Number : 77

Invoice Number : 77

Invoice Date : Jan 7, 2019

Invoice Date : Jan 7, 2019

Customer Reference : CR0077

Customer Reference : CR0077

Bill Period From 01/07/2019 to 31/09/2019

Bill Period From 01/07/2019 to 31/09/2019

FIG. 6

METHOD OF META-DATA EXTRACTION FROM SEMI-STRUCTURED DOCUMENTS

CROSS-REFERENCE TO RELATED APPLICATION

The instant application claims priority to Indian Patent Application Serial No. 201921012225, filed Mar. 28, 2019, pending, the entire specification of which is expressly incorporated herein by reference.

FIELD OF THE INVENTION

The present invention relates to the field of data processing. More specifically, the present invention relates to the method of meta-data extraction from semi-structured documents.

BACKGROUND OF THE INVENTION

"Semi-structured documents/data" refers to documents/data that has structure, but where the contents of particular structural elements need not be consistent. To facilitate this characteristic, data are "self-describing". For example, in a "person" application, a person can be validly defined by semi-structured document with only a subset of all possible data associated with a person, e.g., by only a last name and a telephone number, or a first name, last name, and address, or some other combinations. Or, a person may be defined with additional data not previously seen, such as an employer name, an employer address, and an employer telephone number. Thus, each semi-structured "person" definition may vary.

Semi-structured data are data that do not have a fixed scheme. Semi-structured data, however, have a scheme, either implicit or explicit, but do not have to conform to a fixed scheme. By extension, semi-structure documents are text files that contain semi-structured data.

Examples include documents in HTML and XML and, thus, represent a large fraction of the documents on the Web. The exploitation of the features inherent in such documents is a key to attaining and obtaining better information retrieval is not new.

Semi structured documents, like invoices, bills etc., do not always follow general sentencing format that is from left to right, where every sentence is worded/spaced, close/next to each other. Information (words or phrases) can be separated by huge spaces between them, or information can be arranged in tabular format with or without table boundaries. Due to the nature of the documents, using distance as measure for relevance to identify meta-data label and its value (e.g. Invoice Number: 1007, where Invoice Number is label and 1007 is its value), will perform poorly and will not be always correct.

In semi structured documents, information is structured in tabular layout where labels and values can be densely arranged, which will lead to false positive mappings. Even if we control the mappings by defining boundaries for each value, so that only the relevant set of labels are evaluated for its mapping, we will still have the same problem, and also adding such boundaries will vary from layout to layout. Hence this approach cannot be generalized.

There is need for a method of extracting meta-data from such documents, by using area and cone orientation as relevance between words/phrases and a training mechanism, to handle OCR errors with respect to the coordinates interpreted for each word and user corrections both in online and offline mode.

Definitions

The expression "meta data" used hereinafter in this specification refers to, but is not limited to the set of data or information that provides information about other data.

The expression "semi structured documents" used hereinafter in this specification refers to, but is not limited to the documents/data that has structure, but where the contents of particular structural elements need not be consistent.

The expression "label" used hereinafter in this specification refers to, but is not limited to a continuous sequence of pure alphabetic characters separated by a value in a sentence/line.

The expression "value" used hereinafter in this specification refers to, but is not limited to a continuous sequence of alpha numeric words, and small exhaustive dictionary having potential value words/phrases in a sentence/line.

OBJECTS OF THE INVENTION

The object of the present invention is to provide an integrated method capable of extracting required information from a plurality of semi-structured documents such as invoices, HTML documents that are scattering over open networks, present in procurement systems and have different document structures, presentation styles, and information elements.

Another object of the present invention is to provide a method of extracting meta-data from such documents, by using area and cone orientation as relevance between words/phrases.

SUMMARY OF THE INVENTION

Before the present invention is described, it is to be understood that the present invention is not limited to specific methodologies and materials described, as these may vary as per the person skilled in the art. It is also to be understood that the terminology used in the description is for the purpose of describing the particular embodiments only and is not intended to limit the scope of the present invention.

The present invention provides a method of extracting meta-data from semi structured documents, by using area and cone orientation as relevance between words/phrases. The invention also provides a training mechanism, to handle OCR errors with respect to the coordinates interpreted for each word and user corrections both in online and offline mode. The method is carried out by the steps as follows: converting at least one scanned or digital document to a readable format with coordinates using Optical Character Recognition (OCR) technology; scanning the coordinates obtained through OCR for each character and correcting them to ensure that they all fall in their corresponding base line; marking all potential labels and values from every OCR line text with a bounding box; searching for relevant labels for the particular value by using default x-axis and y-axis control parameters and adjusting trainable parameters; mapping a cone region for the labels and values using the upper and lower angles along x-axis and the scope box; mapping the relevant label for the given value which the projected triangle with the lowest score area and formulating the score area to get the confidence percentage which is used as measure to extract all relevant label-value pairs.

BRIEF DESCRIPTION OF THE DRAWINGS

The present invention, together with further objects and advantages thereof, is more particularly described in conjunction with the accompanying drawings in which:

FIG. 6 shows few examples for Label-Value marking;

DETAILED DESCRIPTION OF THE INVENTION

The present invention provides a computer implemented method of extracting meta-data from semi structured documents, by using area and cone orientation as relevance between words/phrases. The invention also provides a training mechanism, to handle the errors with respect to the coordinates interpreted for each word and user corrections both in online and offline mode.

Figure 1:
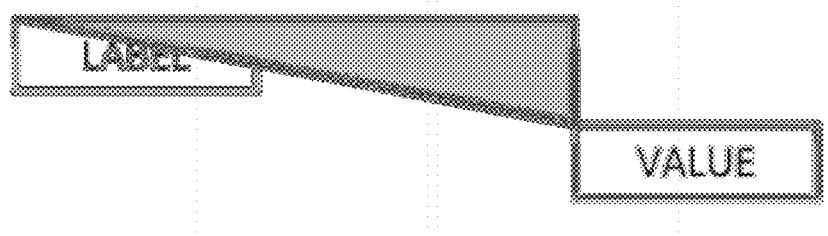
FIG. 1 defines the area for a pair of Label and value as the area of the triangle projected by the label on to the value.
Figure 2:
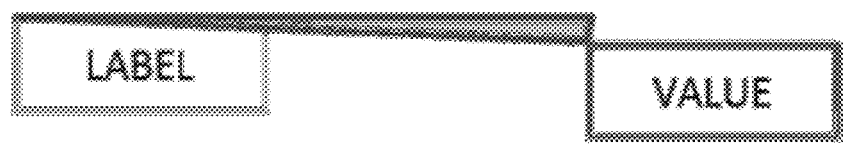
FIG. 2 describes that as the area of the triangle projected by the label on to the value is smaller, more relevant is the mapping.

In the given embodiment of the present invention, Area is used as a measure of relevance between the words/phrases. For a pair of Label and value, the area of the triangle projected by the label on to the value is referred to as area. (FIG. 1). Region marked in grey is the area of the projected triangle. Area is equal to (base*Height)*sin (projected angle)/2. As the projected angle is always 90 degrees, sin (90) equals to 1. Therefore, the smaller the area, more relevant is the mapping (FIG. 2).

Figure 3:
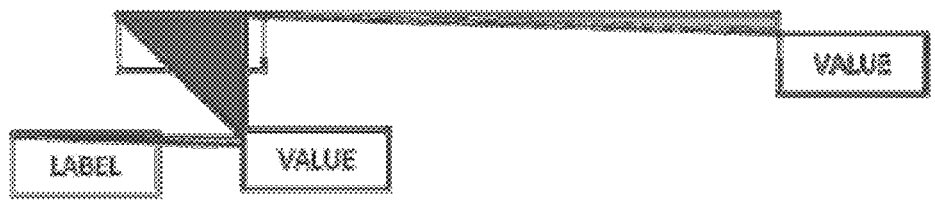
FIG. 3 describes relevant mappings for any type of information structures.
Figures 4, 5:
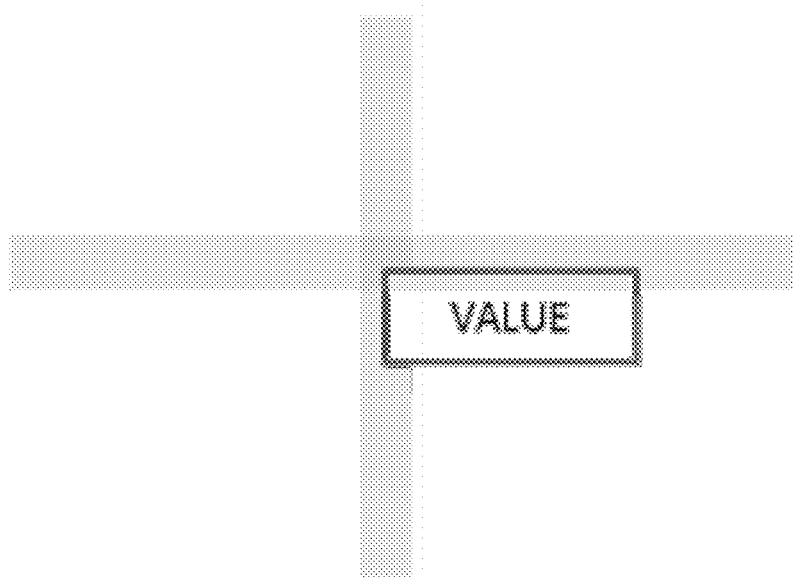
FIG. 4 describes that the labels falling in the grey region are the highest scoring or relevant label mappings for that value. Grey rectangles extend across page width horizontally and to page height vertically.
FIG. 5 shows how the OCR coordinates for each character are scanned and corrected to ensure all fall in their corresponding base line as the OCR coordinates vary and drift from the visual/base line by various factors like font, casing, bold, etc.

By applying this measure, one can clearly see the relevant mappings for any type of information structures (FIG. 3). As shown in FIG. 3, area projected by the black triangle is greater than the grey ones. Here, grey projections (labels) are true mappings for their corresponding values. Using area of the projected triangle as a measure of relevance covers most of the layouts or information structures for extracting meta-data. FIG. 4 shows the labels falling in the grey region are the highest scoring or relevant label mappings for that value. Green rectangles extend across page width horizontally and to page height vertically.

In another embodiment of the present invention, based on the building blocks above, the method for extracting data from semi structured documents is described. The first step is to convert the document (scanned or digital) to a readable format with coordinates. For this OCR is used. Optical Character Recognition, or OCR, is a technology that enables one to convert different types of documents, such as scanned paper documents, PDF files or images captured by a digital camera into editable and searchable data.

In the next step, OCR coordinates for each character are scanned and corrected to ensure that they all fall in their corresponding base line. This step is essential as the OCR coordinates vary and drift from the visual/base line by various factors like font, casing, bold, etc. as shown in FIG. 5. The OCR readings give us only converted text and its coordinates, but one is still unsure of probable labels and values. Therefore, from every OCR line text, potential labels and values are marked with a bounding box. The bounding box is a tightly bounded rectangle to a sequence of characters.

A label is a continuous sequence of pure alphabetic characters separated by a value in a sentence/line. A value is a continuous sequence of alpha numeric words, and small exhaustive dictionary having potential value words/phrases in a sentence/line. FIG. 6 shows few examples for Label-Value marking.

As we can see in FIG. 4, there are many regions where a label can be, but labels falling in the same region at various distances will have same score (area of the projected triangle). In this case, if, for a value, we have a high scoring label to its left and also above it then, it is visually relevant that the label to its left is its true label. To ensure the right labels are evaluated for a value, the view of the value is restricted for searching its relevant label. This is controlled by values at the upper and lower angle along its x-axis. This restricts the values along the y-axis. For mapping label and value it is controlled by x-axis and y-axis. There are default x-axis and y-axis control parameters and adjusted based on trainable parameters. Default parameters are rectangle height: 40, top angle tolerance: −11, bottom angle tolerance: 130, cone scope x axis: 0.3 (% of page width), cone scope y axis bottom: 0.05 (% of page height), cone scope y axis top: 0.05 (% of page height).

Now in the restricted view there can be many high scoring labels, but it is mostly likely that the label is closer to the value. This is controlled by a bounding scope box, restricting the scope along the x-axis (FIG. 7).

Figure 7:
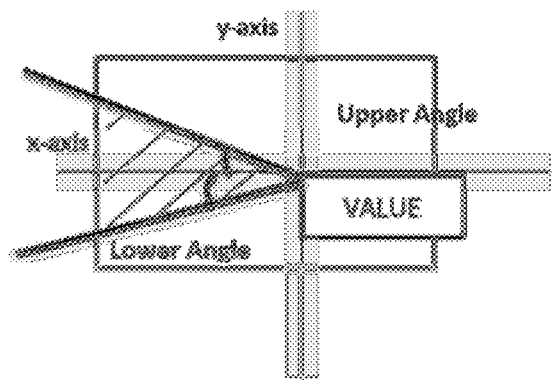
FIG. 7 shows the cone region (crossed line region) to look for relevant labels.
Figure 8:
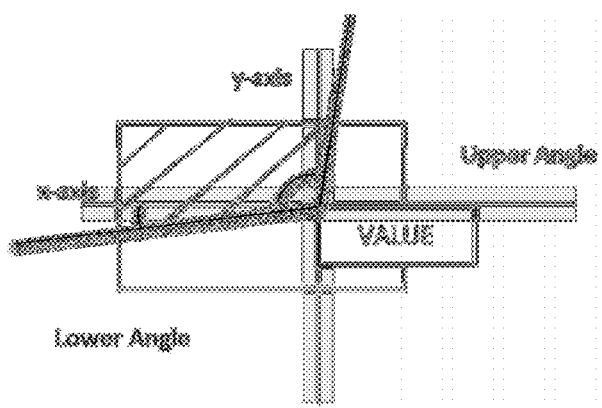
FIG. 8 shows the global/general cone (crossed line region)

Having the upper and lower angles and scope box, the value gets a cone region (crossed line region) as shown in FIG. 7 to look for relevant labels. And these are the base parameters representing the model. These parameters can be inferred if we know the true label-value mappings, making the system trainable. Most of the documents (invoices) fall under general/global cone (crossed line region within the blue box) shown in FIG. 8. This cone takes care of both line and tabular label-value orientation. This is default cone made by default x-axis and y-axis parameters. Default parameters are rectangle height: 40, top angle tolerance: −11, bottom angle tolerance: 130, cone scope x axis: 0.3 (% of page width), cone scope y axis bottom: 0.05 (% of page height), cone scope y axis top: 0.05 (% of page height).

For documents or sections in the document which have different label-value orientation, one gets true negatives, and also due to errors in OCR interpretations with respect to the coordinates (OCR can interpret spacing between words, columns or lines differently, violating the visual relevance) Therefore, a training mechanism has been developed.

The next step of the extraction method involves Label-Value Mapping Extraction. For each value its relevant label is found. From all labels, the label of which its projected triangle with the value has the lowest area (score) is mapped as label for that value. The score is further formulated to get the confidence percentage which is then used as a measure. At this end of this step all relevant Label-Value pairs are extracted, irrespective of the label or value business type.

Once, all Label-values are extracted, it is required to further map them to their business fields.

As business fields can be different for different customers, the mapping is done with the help of a dictionary of business fields with their document labels. Then, an exact match with the document labels is done and it is mapped to its business label. In the context of invoice documents, majority of the invoices follow a similar nomenclature, with slight variation, which makes this system independent of a customizable dictionary.

Another embodiment of the present invention describes the training and feedback mechanism for extraction of data. As seen in the prior paragraphs, the cone parameters can be inferred if one knows the true Label-Value mapping. These parameters form the base for the model representation. Trainable parameters are parameters which can be inferred when the system is given correct Label-Value mapping. The trainable parameters for the cone are Upper Angle and Lower Angle and for the scope box (boundaries) are X Scope Left (Bounding Box), X Scope Right (Bounding Box), Y Scope Top (Bounding Box) and Y Scope Bottom (Bounding Box). The above parameters for a label-value mapping represent the model. In the document on a page, trained parameters for all given Label-Value pairs is the Model created for that document.

The Upper and lower angles are calculated as +/−n degrees above and below the projected diagonal of the triangle, by that Label-Value pair. Basically, this acts as a buffer area/Torrance at the time of extraction. X and Y Scope are calculated as +/−p pixels above, below, left and right.

Another embodiment of the present invention describes the Label-Value extraction using Trained Model. The approach is same as there is for untrained model, but in this embodiment one looks for only those labels which fall under the trained block (Bounding Box) and in the cone orientation. In this case, the triangle will not be projected at 90 degrees, but at an angle where the label-value was trained. And score and confidence are calculated accordingly. The score/area calculation will be same but, with the projected angle (not 90 degrees).

The above training mechanism is primarily useful when one has both label and its value as a pair. But, usually one only has value (say 1007 as invoice number), without the document label. In such cases, a different training approach is required. In this different training approach, one learns on the bounding box, and captures the value's bounding box and its business label.

The Trained parameters are X Scope Left (Bounding Box), X Scope Right (Bounding Box), Y Scope Top (Bounding Box), Y Scope Bottom (Bounding Box), Value's bounding box and Business Label. In this approach, the value is directly mapped to its business label, if there is a value falling in the trained block with the highest confidence (calculated from score). As one doesn't have the learnt cone, one cannot use the projected triangle. Instead the Area can be used if the rectangle is overlapping with trained value bounding box, as the base score. This score is further used to calculate the final score (different form area of triangle and rectangle), which is then used to calculate its confidence and use it as a final score/measure.

Figure 9:
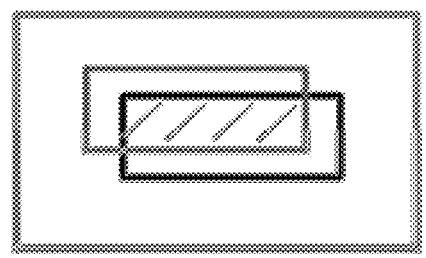
FIG. 9 shows the Base score as the area of the intersecting rectangle (crossed lines region) where black rectangle is trained value bounding box and grey rectangle is the actual value which falls within the trained bounding box.

Another embodiment of the invention describes the final score formulation. As shown in FIG. 9, base score is the area of the intersecting rectangle (crossed lines region) where black rectangle is trained value bounding box and red rectangle is the actual value which falls within the trained bounding box. Final score is calculated as log to the base (base score) multiplied by area of the black rectangle.

Every document processed and every model created will have its signature. Signature is the bag of words which fall in top n % of the page. For example, top 20% area of invoice will mention invoice and invoice number, product number, date, and other labels and value, these string of words available in top 20% is signature. The % of the page depends on the type of document. Only Labels are considered in the bag-of-words. This signature helps in differentiating between different document layouts. While processing a document, its signature is generated and matched with the model's signature. If the match is more than x %, then the learning from that model will be used. Top n % label bag-of-words takes care of structural differentiation. Label bag-of-words makes it a robust document identifier. If Labels change drastically then a non-colliding signature is produced. If the structure changes it's a different document layout and will produce a non-colliding signature.

In the present invention, the training mechanism can used to train in bulk or on one-on-one basis as a feedback mechanism. In any business context, if user has a set of invoices for which he/she has already extracted meta-data manually into his/her system. The training can be done for those invoices and model base can be created and used as an asset. This will ensure high accuracy, and coverage without aging with the system. And any new correction on one-on-one basis will be merged with the historical models and the latest learning will always supersede the old ones.

Example

The method is tested for four different business fields and the accuracy and coverage is found before and after learning. As can be seen from the tables below, the method performs well even without learning. And, after learning accuracy is almost 95%. These statistics are over 2000 invoices. Many of the invoices are not proper invoices (letter heads, hand written documents, very poor resolution scanned documents, etc.).

Before Learning:

| Business Field | Accuracy | Potential coverage | True coverage |
| --- | --- | --- | --- |
| Invoice number | 86.57% | 49.69% | 43.02% |
| Invoice date | 69.10% | 68.49% | 47.33% |
| Invoice due date | 18.72% | 42.02% | 7.86% |
| Purchase order | 78.46% | 19.11% | 14.99% |

After learning:

| Business Field | Accuracy | Potential coverage | True coverage |
| --- | --- | --- | --- |
| Invoice number | 99.18% | 49.69% | 49.29% |
| Invoice date | 97.15% | 68.49% | 66.54% |
| Invoice due date | 19.46% | 42.02% | 8.17% |
| Purchase order | 95.01% | 19.11% | 18.16% |

The disclosure has been described with reference to the accompanying embodiments which do not limit the scope and ambit of the disclosure. The description provided is purely by way of example and illustration.

The embodiments herein above and the various features and advantageous details thereof are explained with reference to the non-limiting embodiments in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification, the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of files, acts, materials, devices, articles or the like that has been included in this specification is solely for providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. A computer implemented method of extracting meta-data from semi structured documents, by using area and cone orientation parameters as relevance between words/phrases and a system to provide a training mechanism, to handle OCR errors with respect to the coordinates interpreted for each word and user corrections both in online and offline mode, comprising the steps of:
   converting at least one scanned or digital document to a readable format with coordinates using optical character recognition (OCR) technology;
   scanning the coordinates obtained through OCR for each character and correcting them to ensure that they all fall in their corresponding base line;
   marking all potential labels and values from every OCR line text with a bounding box;
   searching for relevant labels for the particular value by using default x-axis and y-axis control parameters and adjusting trainable parameters;
   mapping a cone region for the labels and values using the upper and lower angles along x-axis and the scope box;
   mapping the relevant label for the given value which the projected triangle with the lowest score area; and
   formulating the score area to get the confidence percentage which is used as measure to extract all relevant label-value pairs.

2. The method as claimed in claim 1, wherein for a pair of label and value, the area of the triangle projected by the label on to the value is referred to as area as shown by grey triangle.

3. The method as claimed in claim 2, wherein a small area of the projected triangle leads to accurate label and value mapping.

4. The method as claimed in claim 3, wherein using the area of the projected triangle as a parameter for measure of relevance covers most of the information structures for extracting meta-data.

5. The method as claimed in claim 1, wherein the coordinates obtained through OCR vary and drift from the visual/base line by at least one factor selected from font, casing and bold letters thereby requiring corrections to ensure that they all are in their corresponding base line.

6. The method as claimed in claim 1, wherein the default parameters are rectangle height as 40, top angle tolerance as −11, bottom angle tolerance as 130, cone scope x axis as 0.3% of page width, cone scope y axis bottom as 0.05% of page height and cone scope y axis top as 0.05% of page height.

7. The method as claimed in claim 1, wherein the extracted label-values pairs are further mapped to their respective business fields with the help of a dictionary of business fields with their document labels.

8. The method as claimed in claim 1, wherein the system infers the cone parameters from the known true label-value mapping and said parameters form the base for the model representation.

9. The method as claimed in claim 1, wherein the trainable parameters for the cone are upper angle and lower angle and for the scope box (boundaries) are X scope left (bounding box), X scope right (bounding box), Y scope top (bounding box) and scope bottom (bounding box).

10. The method as claimed in claim 1, wherein the final score is calculated using the base score that is the area of the intersecting rectangle represented by crossed lines.

* * * * *